United States Patent [19]

Becker

[11] Patent Number: 5,002,345
[45] Date of Patent: Mar. 26, 1991

[54] HYDRAULIC BRAKE SYSTEM FOR AUTOMOTIVE VEHICLES

[75] Inventor: Horst P. Becker, Frankfurt am Main, Fed. Rep. of Germany

[73] Assignee: Alfred Teves GmbH, Frankfurt am Main, Fed. Rep. of Germany

[21] Appl. No.: 22,779

[22] Filed: Mar. 5, 1987

[30] Foreign Application Priority Data

Mar. 6, 1986 [DE] Fed. Rep. of Germany ....... 3607367

[51] Int. Cl.$^5$ .............................................. B60T 8/44
[52] U.S. Cl. .................................... 303/119; 303/113; 303/115
[58] Field of Search ............... 188/181 A; 303/10, 11, 303/113, 114, 115, 116, 119, DIG. 3, DIG. 4

[56] References Cited

U.S. PATENT DOCUMENTS

| | | | |
|---|---|---|---|
| 3,550,966 | 12/1970 | Leiber | 303/119 |
| 3,866,983 | 2/1975 | Kondo | 303/119 |
| 3,871,714 | 3/1975 | Behrend | 303/10 |
| 3,976,336 | 8/1976 | Sekiguchi | 303/113 |
| 4,033,637 | 7/1977 | Leiber | 303/115 X |
| 4,165,136 | 8/1979 | Erlbeck | 303/19 X |
| 4,568,130 | 2/1986 | Leiber | 303/114 X |
| 4,580,347 | 4/1986 | Burgdorf | 303/119 X |
| 4,589,706 | 5/1986 | Leiber | 303/119 |
| 4,629,258 | 12/1986 | Resch et al. | 303/114 X |
| 4,640,558 | 2/1987 | Nomura et al. | 303/119 |
| 4,662,688 | 5/1987 | Reinartz | 303/119 X |
| 4,685,747 | 8/1987 | Belart et al. | 303/114 |
| 4,687,260 | 8/1987 | Matsui et al. | 303/116 X |
| 4,715,664 | 12/1987 | Nakanishi et al. | 303/116 X |

FOREIGN PATENT DOCUMENTS

| | | |
|---|---|---|
| 1958628 | 11/1969 | Fed. Rep. of Germany ...... 303/113 |
| 3429258 | 4/1986 | Fed. Rep. of Germany . |
| 2158904 | 11/1985 | United Kingdom ................ 303/114 |

*Primary Examiner*—Matthew C. Graham
*Attorney, Agent, or Firm*—Robert P. Seitter; J. Gordon Lewis

[57] ABSTRACT

A hydraulic brake system for automotive vehicles comprising a brake master cylinder (1) connected to an unpressurized reservoir (12) and a brake line communicating with a working chamber (4, 5) of the brake master cylinder (1) and leading to pressure control valves (17, 18) of a brake slip control apparatus (19), connected downstream of which valves is at least one wheel brake. The working chamber (4, 5) of the brake master cylinder (1) on activation of the brake slip control apparatus (19), is connectable to a pressure-fluid source (30) by way of a throttling non-return valve (15, 16) closable in the direction of the wheel brake. The pressure of the fluid source is controlled to correspond to at least the pressure in the working chamber (4, 5) of the brake master cylinder (1). Thus, the brake system requires little structural and monitoring efforts and affords an energy supply for the brake slip control apparatus which is independent of the actuating system of the brake master cylinder.

11 Claims, 1 Drawing Sheet

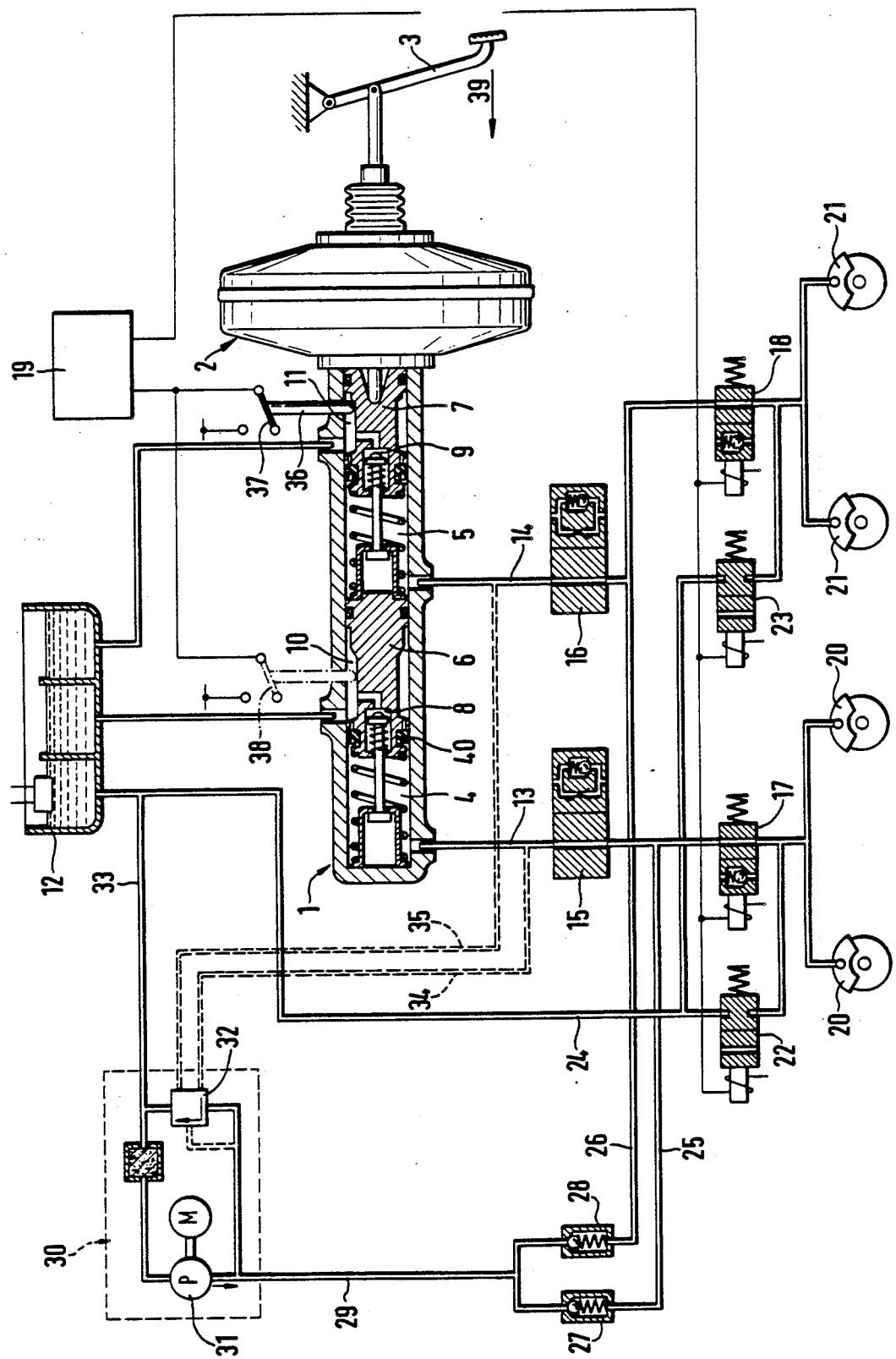

HYDRAULIC BRAKE SYSTEM FOR AUTOMOTIVE VEHICLES

BACKGROUND OF THE INVENTION

The present invention relates to a hydraulic brake system for automotive vehicles comprising a brake master cylinder connected to an unpressurized reservoir. A brake line communicates with a working chamber of the brake master cylinder and leads to pressure control valves of a brake slip control apparatus. Connected downstream of the valves is at least one wheel brake.

In brake systems of this type, a quantity of pressure fluid is required during operation of the brake slip control apparatus for the repeated actuation of the wheel brake after a pressure discharge. The required quantity significantly exceeds the delivery rate of the brake master cylinder. Therefore, the operation of the brake slip control apparatus necessitates that the wheel brake is supplied with pressure fluid out of an additional pressure-fluid source, for example, an energy supply system, independently of the brake master cylinder.

A brake system is known from patent application P 34 39 258.0, wherein there is provision of a brake power booster fed by a hydraulic energy supply system for the actuation of the brake master cylinder. The brake line in this brake system is connectable with the booster chamber of the brake power booster by way of an electromagnetically actuatable control valve of the brake slip control apparatus and by way of a non-return valve connected downstream thereof. This supplies the wheel brake cylinders with pressure fluid out of the energy supply system of the brake power booster during operation of the brake slip control apparatus. Further more, a controllable non-return valve is interposed between the brake master cylinder and the connecting point of the control valve, which non-return valve is caused by the pressure metered through the control valve to assume a closed position in which only return flow of pressure fluid to the brake master cylinder is kept in a standby position during operation of the brake slip control apparatus. However, this solution is restricted to brake systems which comprise a hydraulic brake power booster. Such brake systems entail comparatively high costs and, therefore, are not commercially acceptable for smaller vehicles. Another shortcoming of this brake system is that the proper functioning of the hydraulic brake power booster and that of the brake slip control apparatus are dependent on one another.

Therefore, it is the object of the present invention to devise a brake system of the type initially referred to which, while requiring little structural and monitoring efforts, affords an energy supply for the brake slip control apparatus which is independent of the actuating system of the brake master cylinder.

SUMMARY OF THE INVENTION

This object is achieved by the present invention in that, on activation of the brake slip control apparatus, the working chamber of the brake master cylinder is connectable to a pressure-fluid source by way of a throttling non-return valve which closes in the direction of the wheel brake. The pressure of the pressure-fluid source is controlled such as to correspond to at least the pressure in the working chamber of the brake master cylinder. This brake system does not require hydraulic brake force boosting for the actuation of the brake master cylinder and the need for a pressure accumulator and a main valve is obviated. The brake slip control apparatus controls the supply of the needed quantity of pressure fluid from an additional pressure-fluid source which is connectable to the brake master cylinder with little structural effort. In the event of increased slip being sensed at the wheels, the brake slip control apparatus will switch on the pressure-fluid source. In this arrangement, the pressure of the wheel brakes is modulated by solenoid valves, which are opened in their energized state and which are closed in their de-energized state. When there is a requirement for a maximum quantity of pressure fluid, pressure fluid is delivered to the wheel brake cylinders both by the pump and by the brake master cylinder by way of a strong throttle. As soon as pressure buildup has been effected, the surplus quantity of pressure fluid generated by the pressure-fluid source is delivered back into the brake master cylinder through the non-return valve open in this direction and thus shifts the master cylinder piston and hence also the brake pedal back again. Consequently, the brake master cylinder simultaneously serves as an accumulator for the case that the delivery rate of the pump is not sufficient at that moment (such as during an abrupt change in the coefficient of friction). The volume required in addition is taken from the brake master cylinder and replenished by the pump afterwards.

Preferably, the pressure-fluid source comprises a pump the drive of which is controllable by the brake slip control apparatus and the pressure of which is adjustable by means of a pressure control valve controllable by the pressure in the brake master cylinder. The control valve pressure is slightly in excess of the pressure in the brake master cylinder. This allows regulation of the pump pressure pedal-force-responsively by means of the control valve.

According to an advantageous embodiment, a travel-responsive switch is actuatable depending on the travel the master cylinder piston performs, the switch serving to disconnect the brake slip control apparatus. The travel-responsive switch serves as a monitoring arrangement for the brake system in order to safeguard a residual stroke in the brake master cylinder upon the occurrence of leakage in the brake system.

The present invention likewise affords advantages when used in a tandem brake master cylinder wherein the two working chambers are separately connectable to the pressure-fluid source.

According to a preferred embodiment of the present invention, throttling non-return valves are interposed between the working chambers of the brake master cylinder and the wheel brakes having the capacity of change-over valves controllable by the pressure of the pressure-fluid source or electromagnetically by virtue of the brake slip control apparatus.

Advantageously, it is likewise possible to insert between the working chambers of the tandem brake master cylinder and the wheel brakes two-way/two-position directional control valves which are controllable by the pressure of the pressure-fluid source or electromagnetically by the brake slip control apparatus, with each one throttle and one non-return valve being connected in parallel to the directional control valves, the non-return valve closing in the direction of the wheel brake cylinder.

To be able to reliably keep the brake system closed in relation to the pressure-fluid source when the pressure-fluid source is not switched on, expediently, each one non-return valve is arranged intermediate the outlet of the pressure-fluid source and the switchable throttling non-return valves. The actuation of the tandem brake master cylinder can be performed by a vacuum brake power booster according to the present invention. To this effect, it is favorable that the brake power booster is driven independently of the pressure-fluid source and therefore remains effective in the event the pressure-fluid source fails.

In a further improvement, the solenoid valves which are open in their de-energized state each contain in one conduit one non-return valve which closes in the direction of the wheel brakes. According to another embodiment of the invention, the solenoid valves may also be two-way/two-position directional control valves, connected in parallel whereto is each one non-return valve closing in the direction of the wheel brakes. Suitably, the travel-responsive switches can be actuated by pins which are slidable by means of inclined actuating surfaces of the master cylinder pistons.

BRIEF DESCRIPTION OF THE DRAWING

The present invention will be explained in more detail hereinbelow by way of an embodiment illustrated in the accompanying drawing wherein the single figure illustrates a wiring diagram of a dual-circuit hydraulic brake system for an automotive vehicle with a partial longitudinal cross-section taken through a braking pressure generator.

DETAILED DESCRIPTION

Referring now to the drawing the braking pressure generator comprises a tandem brake master cylinder 1 and a vacuum brake power booster 2 which is actuatable by a brake pedal 3. The tandem brake master cylinder 1 which is illustrated in cross-section contains two isolated working chambers 4, 5 which can be diminished by virtue of an actuating stroke of the master cylinder pistons 6, 7. By way of central valves 8, 9 which are open in their illustrated initial position, the working chambers 4, 5 are connectable with supply chambers 10, 11 communicating with an unpressurized supply reservoir 12.

Brake lines 13, 14 lead from working chambers 4, 5 of the tandem brake master cylinder 1 to switchable throttling non-return valves 15, 16, connected to which are solenoid valves 17, 18 of a brake slip control apparatus 19 which are opened in their de-energized state. Connected to the solenoid valves 17, 18 are two wheel brakes 20, 21. One of the wheel brakes 20 and 21, respectively, is allocated to one front wheel of a vehicle, while the other one of the wheel brakes 20 and 21, respectively, is allocated to a rear wheel of the vehicle disposed diagonally to the front wheel. This means a dual-circuit brake system with diagonal circuit split-up is provided. The present invention can also be employed in the same manner in a front/rear circuit allotment.

The front brakes 20 and 21 are further connected to two solenoid valves 22, 23 which are closed in their de-energized state and the inlet side of which is in communication with the supply reservoir 12 by way of a return line 24. The solenoid valves 17, 18, 22 and 23 are arranged in a valve block (not shown).

Each pressure line 25, 26 branches off intermediate the switchable throttling non-return valves 15, 16, the non-return valve thereof closing in the direction of the wheel brakes, and the solenoid valves 17, 18 which are opened in their de-energized state. Each pressure line 25, 26 leads to a separate non-return valve 27, 28 which is closed in the inactive position and likewise accommodated in the valve block. The non-return valves 27, 28 are arranged such as to open only towards the pressure lines 25, 26. A pressure line 29 leads from the non-return valves 27, 28 to the outlet of a pressure-fluid source 30, for example, a motor-pump unit composed of an electromotively driven pump 31 and a pressure control valve 32. The inlet of the pressure-fluid source 30 is connected to the reservoir 12 by way of a line 33.

The pressure control valve 32 which simultaneously may be designed as pressure-relief valve is acted upon by the pressure of the working chambers 4, 5 of the tandem brake master cylinder 1. To this end, lines 34, 35 are provided between the working chambers 4, 5 and the control ports of the pressure control valve 32. Pressure control valve 32 can be actuated by one of the working chambers 4, 5 as well as by both of the working chambers. The pressure control valve 32 serves to control the pump pressure pedal-force responsively, with the controlled pressure being slightly in excess of the pressure of the working chambers 4, 5.

The master cylinder piston 7 of the tandem brake master cylinder 1 includes an inclined actuating surface for a pin 36 of a travel-responsive switch 37 which is connected to the brake slip control apparatus 19. Instead of the travel-responsive switch 37, one travel-responsive switch 38 can be provided which is illustrated in dash-dot lines in the drawing and is actuated by the master cylinder piston 6, or two travel-responsive switches 37 and 38.

The travel-responsive switches 37, 38 will disconnect the brake slip control apparatus 19 when they are overridden by the pertinent master cylinder pistons 6, 7. A residual stroke of the tandem brake master cylinder 1 is safeguarded thereby. This is because should the brake system have a leak, the pump 31 would no longer be able to deliver the volume of pressure fluid escaping from the leak. As a result, the stroke of the brake master cylinder would slowly become exhausted, the consequence thereof being that a braking action would not be possible at all. For this reason, after one of the travel-responsive switches 37, 38 has been overridden, the controlled braking action performed by the brake slip control apparatus 19 will be cancelled. The solenoid valves 17, 18 will be switched to open again and the solenoid valves 22, 23 will no longer permit pressure to discharge from the wheel brakes 20, 21 into the supply reservoir 12. This enables the performing of a braking action at least with the still intact brake circuit, since the pertinent master cylinder piston 6, 7 has not been displaced until its stop. Arranging the travel-responsive switch 37 in the displacement travel of the master cylinder piston 7 bears the advantage that thereby the entire stroke of the tandem brake power booster 1 is monitored.

The operation of the described brake system is as follows: To initiate a braking action, the brake pedal 3 is applied in the direction of the arrow 39, and the vacuum brake power booster 2 is driven. Thereby, the vacuum brake power booster 2 causes the two master cylinder pistons 6, 7 to move into the tandem brake master cylinder 1, as a result whereof first the central valves 8, 9 are closed and the working chambers 4, 5 are isolated from the supply chambers 10, 11. Further displacement of the master cylinder pistons 6, 7 causes pressure to develop in the working chambers 4, 5 which propagates through the brake lines 13, 14 through the opened throttling non-return valves 15, 16 and through the open solenoid valves 17, 18 to the wheel brakes 20, 21 and actuates these corresponding to the actuating force applied on the brake pedal 3. The pump 31 is not switched on in this phase of actuation so that no pressure is built up in the pressure line 29. The non-return valves 27, 28 are closed and are kept in their closed position additionally by the pressure in the pressure lines 25, 26 connected to the switchable throttling non-return valves 15, 16.

When now during a braking action an imminent locked condition of a vehicle wheel is detected by the brake slip control apparatus 19, the motor-pump unit is switched on without delay and the pump 31 is driven with full power and the throttling non-return valves 15, 16 are switched over. This results in development of a pressure in the pressure line 29 which is in excess of the actuating pressure in the brake lines 13, 14 and the pressure lines 25, 26, respectively, so that the non-return valves 27, 28 will open and the quantity of pressure fluid delivered by the pump 31 will be fed through the pressure lines 25, 26 into the wheel brakes 20, 21. The pressure in the wheel brakes 20, 21 is modulated by the solenoid valves 17, 18, 22, 23, those opened in their de-energized state and those closed in their de-energized state.

To prevent depression of the brake pedal through its full travel when the wheels of the vehicle change from a high coefficient of friction to a low one, pressure fluid is fed into the wheel brakes in each case by way of the strong throttle only, when the throttling non-return valves 15, 16 have been switched over. In case the delivery rate of the pump 31 is not sufficient at that moment (as during an abrupt change in the coefficient of friction) in order to meet the demand of the wheel brakes, the pressure fluid volume required is taken from the brake master cylinder 1. When the pressure fluid demand of the wheel brakes is again less than the delivery rate of the pump 31, during the period in which the pressure is maintained constant and reduced, the surplus pressure fluid will be used for replenishment of the working chambers 4, 5 by way of the non-return valves of the throttling non-return valves 15, 16. This means, the tandem brake master cylinder 1 is used as an accumulator.

When the travel-responsive switch 37 and 38, respectively, is actuated by the master cylinder pistons 6, 7, the brake slip control apparatus 19 is disconnected in order to preserve a specific residual stroke in the tandem brake master cylinder 1. Should there be a leak in the wheel brakes and/or in the lines leading to the wheel brake cylinders, the pump 31 is no longer able to deliver the pressure fluid volume which escapes from the leak so that the stroke of the brake master cylinder slowly would become exhausted. This would render the brake completely inoperable though. Therefore, the braking with slip control is disconnected after the travel-responsive switch 37, 38 has been overridden, that means the throttling non-return valves 15, 16 are switched to open so that pressure discharge from the wheel brake cylinders 20, 21 into the supply reservoir 12 is not possible any more, whereby a braking action is allowed to be still performed at least with the intact brake circuit.

The switchable throttling non-return valves 15, 16 are controlled by the pressure of the pressure-fluid source 30 in the embodiment illustrated in the drawing. However, an electromagnetic control through the brake slip control apparatus 19 is also possible. The throttling non-return valves 15, 16 form an integral unit with the throttle and the non-return valve. However, instead, two-say/two-position directional control valves can also be used. Connected in parallel with such control valves is each one on throttle and one non-return valve, with such control valves is each one throttle and one non-return valve, with the non-return valve closing towards the wheel brakes. The advantage thereof being that readily available component parts can be used. The control of the two-way/two-position directional control valve, in turn, can be effected by means of the pressure of the pressure-fluid source 30 or electromagnetically.

Preferably, the solenoid valves 17, 18 are designed as two-way/two-position directional control valves having a non-return valve in one way which closes in the direction of the wheel brake. These valves can also be replaced by one two-way/two-position directional control valve, connected in parallel whereto is each one non-return valve. This embodiment likewise includes standard component parts. Both the vacuum brake power booster 2 and the tandem brake master cylinder 1 with the two central valves 8, 9 as well as the valve block comprising the solenoid valves 17, 18, 22, 23, those opened in their de-energized state and those closed in their de-energized state, are of a conventional type of construction. The pump 31 can be driven by an electric motor or via the drive and, respectively, the axle of the vehicle.

As there is no need for a pressure accumulator, for monitoring the differential pressure to recognize a failure of the pump, and no need for a resetting unit and for a main valve, and since a low-cost tandem brake master cylinder and a low-cost vacuum brake power booster can be utilized, the brake system in accordance with the present invention lends itself to being manufactured particularly economically. Further, pump 31 need only be designed for short-timer operation. Therefore, the brake system is particularly suitable for small vehicles.

What is claimed is:

1. A hydraulic brake system for automotive vehicles comprising a brake master cylinder connected to an unpressurized reservoir and a brake line communicating with a working chamber of the brake master cylinder and leading to pressure control valves of a brake slip control apparatus, connected downstream of which valves is at least one wheel brake, wherein on activation of the brake slip control apparatus (19), the working chamber (4, 5) of the brake master cylinder (1) is connectable to a pressure-fluid source (30) by way of at least one throttling non-return valve (15, 16) which closes in the direction of the wheel brake said throttling non-return valve comprising a non-return valve having a parallel connected throttle which throttle limits pressure fluid flow from said working chamber to said wheel brake upon actuation of said brake control apparatus (19), and means for controlling the pressure of the pressure-fluid source to correspond to at least the pressure in the working chamber (4, 5) of the brake master cylinder (1).

2. A brake system as claimed in claim 1 wherein depending on the travel a master cylinder piston (6, 7) of the brake master cylinder (1) performs, a travel-responsive switch (37, 38) is actuatable which serves to disconnect the brake slip control apparatus (19).

3. A brake system as claimed in claim 1, wherein the pressure-fluid source (30) comprises a pump (31), the drive of which is controllable by the brake slip control apparatus (19) and the pressure whereof is adjustable by means of a pressure control valve (32) which is controllable by the pressure in the brake master cylinder (1) and the pressure of which valve is slightly in excess of the pressure in the brake master cylinder (1).

4. A brake system as claimed in claim 3, wherein the brake master cylinder (1) is a tandem brake master cylinder having two working chambers (4, 5) which are separately connectable to the pressure-fluid source (30).

5. A brake system as claimed in claim 3, wherein interposed between the working chambers (4, 5) of the brake master cylinder (1) and the wheel brakes (20, 21) are throttling non-return valves (15, 16) having the capacity of change-over valves controllable by said brake system.

6. A brake system as claimed in claim 1, wherein two-way/two-position directional control valves are inserted between the working chambers (4, 5) of the tandem brake master cylinder (1) and the wheel brakes (20, 21) which valves are controllable by the brake slip control apparatus (19), with each one throttle and one non-return valve, the latter one closing in the direction of the wheel brake cylinder, being connected in parallel to the directional control valves.

7. A brake system as claimed in claim 6 wherein one non-return valve (27, 28) is arranged intermediate the outlet of the pressure-fluid source (30) and each of throttling non-return valves (15, 16).

8. A brake system as claimed in claim 1, wherein the brake master cylinder comprises a tandem brake master cylinder (1) which is actuated by a vacuum brake power booster (2).

9. A brake system as claimed in claim 1, wherein solenoid valves (17, 18) are respectively provided between the wheel brakes (20, 21) and a corresponding pair of said throttling non-return valves (15, 16) and each of said solenoid valves containing one non-return valve which closes in the direction of the wheel brakes (20, 21).

10. A brake system as claimed in claim 9, wherein the solenoid valves (17, 18) are two-way/two-position directional control valves, wherein each non-return valve closing in the direction of the wheel brakes (20, 21) and respectively contained in said two-way/two-position directional control valves is connected between said wheel brakes and said throttling non-return valves (15, 16) when said control valves are in one of its two positions.

11. A brake system as claimed in claim 1, including travel-responsive switches (37, 38) which are operatively connected to said slip control apparatus (19) and which can be actuated by pins (36) which are slidable by means of inclined actuating surfaces of master cylinder pistons (6, 7) of said brake master cylinder, said travel-responsive switches (37, 38) deactivating said slip control apparatus upon a predetermined movement of said cylinder pistons (6, 7).

* * * * *